J. Griffin,
Bellows
Nº 23,084.     Patented Mar. 1, 1859.
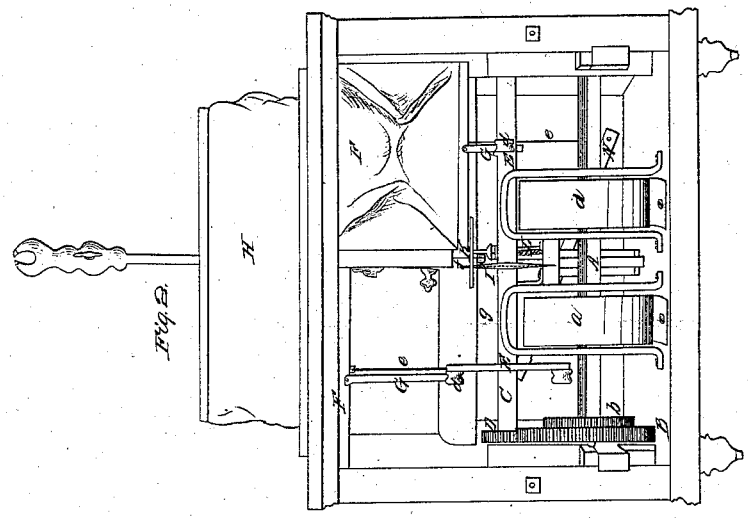
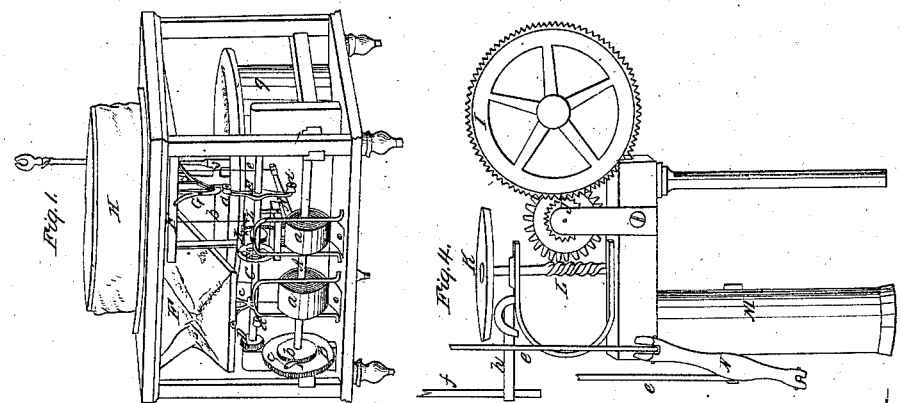
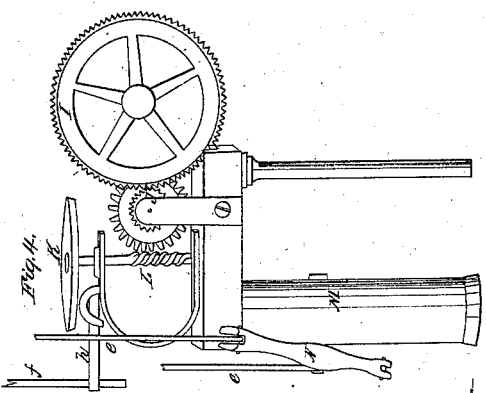
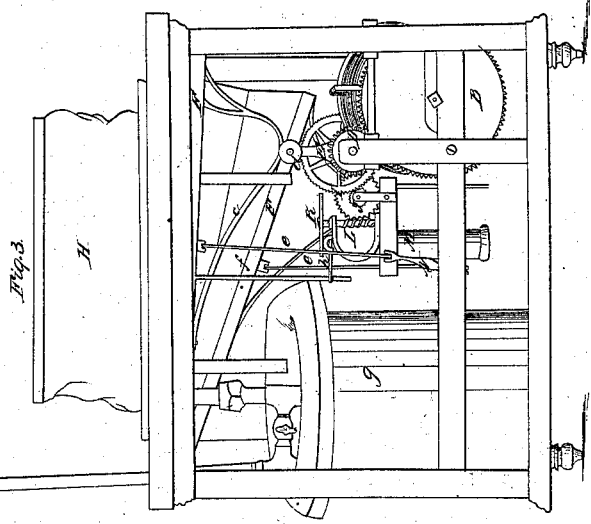
Inventor:
Jonathan Griffin
Witnesses:
Alex. S. Rowley
Arthur Parton

UNITED STATES PATENT OFFICE.

JONATHAN GRIFFIN, OF HARPERSFIELD, NEW YORK.

MACHINE FOR BLOWING UNIFORM CURRENTS OF AIR.

Specification of Letters Patent No. 23,084, dated March 1, 1859.

*To all whom it may concern:*

Be it known that I, JONATHAN GRIFFIN, of Harpersfield, in the county of Delaware and State of New York, have invented a new and useful machine for blowing or producing a steady and uniform current of air for mechanical, chemical, and other purposes by the use of springs or weights as the motive power thereof, which I call Griffin's Spring-Blower; and I do hereby declare that the following is a clear and exact description of the construction and operation of the same, reference being had to the annexed drawings, making a part of this specification, in which—

Figure 1, is a perspective view. Fig. 2, is a longitudinal elevation. Fig. 3, a transverse or side elevation and Fig. 4, a detached vertical section of the governor or regulator, and the following letters thereon indicate the several parts of the machine.

Letter A is the main shaft to which the springs are attached.

B is the driving wheel on main shaft.

C is the pinion shaft.

D is the pinion operated on by the driving wheel B.

E, E, are the two cross-arms on pinion shaft.

F, F, are the two feeders which supply air to the air-chamber.

G, G, are the elevating curved ways on which rollers d, d, d, d, traverse.

H is the reservoir or air-chamber.

I is the driving wheel of the governor or regulator.

J is the pinion connecting fly wheel K, with driving wheel I.

K is the balance or fly-wheel.

L is the vertical endless screw.

M is the governor stand or support.

N is the balance beam.

a, a, are the two springs or motors of the machine.

b, is the ratchet wheel adjoining the driving wheel B.

c, is the dog or check to ratchet.

d, d, d, d, are grooved sheaves or rollers revolving on pins at the ends of the cross-arms E E.

e, e, are the two wire springs connecting each end of the balance beam N with the feeders.

f, is the air-chamber check for regulating the quantity of air admitted according to that discharged.

g, is the vessel for chemicals.

h, is the sliding arm or balance wheel brake on f.

The nature of my invention consists in providing the feeders and air-chamber of a spring or weight power blower with checks and regulators to equalize and regulate the blast or current of air produced.

To enable others skilled in the art to make and use my invention I will proceed to describe its construction and operation.

I construct my spring blower by using two or more bellows F, F, as feeders and a reservoir or air-chamber H into which the wind is forced. The alternating motion of the feeders is produced by the force of one or more springs, a, a, or by a weight attached to the shaft A which is provided with a geared driving wheel B working into the pinion D, at the end of the second shaft C, lying parallel with the first. To this pinion shaft, below and nearly opposite the middle of each of the feeders I attach two cross-arms E, E, or more, according to the number of feeders used, having grooved sheaves or rollers d, d, d, d, at each end. These rollers as they revolve operate on inverted and curved elevating ways G G, attached to the bottoms of the feeders, having such form and inclination on each side as to give the motion required. On this pinion shaft I also attach another lighter cog-wheel I, which works into the pinion J at the center of and attached to a smaller cog-wheel which operates the vertical endless screw L surmounted by the balance or fly-wheel K. This combination I employ as a governor of, or check to, the force of the springs a, a, regulating the motion of the whole machine. The momentum of the balance wheel equalizes the operation of the cross-arms on the elevating ways, aiding them in overcoming what may be called the dead points on the ways, and moderating their progress over the less difficult portions thereof.

To regulate the quantity of air admitted into the air-chamber H I pass a wire through the center of the bottom of the chamber and connect its upper extremity with a small elastic spring attached to the inside of the top of the chamber at its center. On this wire and near its lower extremity I place a sliding arm $h$, extending to the balance wheel K and having at its end an india rubber or buck skin pad, which operates as a break or check whenever the top of the chamber is elevated so as to bring it in contact with the under side of the balance wheel K. This sliding arm may be set at any required point on the wire, $f$, and kept in place by a screw and nut or a stop of any similar device. In order to overcome and stop the force of the motive power, when the chamber is full, and to regulate and moderate its descent from the highest point of inflation without disturbing the current of air by any jerk or forcible reaction, I connect the top and bottom of the air-chamber H by means of india rubber straps or other springs, sufficient in number and power to effect the object.

To the lower side and in the diameter of the head of the chamber equidistant from the center I attach two metallic guide rods, which as it rises and falls move up and down in two corresponding metallic tubes made perfectly tight at their lower ends. These tubes are attached to and extend below the bottom of the chamber, and with the rods are used to guide and steady the air-chamber.

The springs or weights attached to the driving wheel shaft are wound up by means of a crank or key applied to the end of the shaft A. Attached to this shaft and adjoining the driving wheel B is the ratchet wheel, $b$, with a dog, $c$, holding it in place. The main shaft A of course revolves in the driving wheel on winding up.

The curvilinear reversed elevating ways on which the rollers $d$, $d$, $d$, $d$, traverse, pass inside and below the pinion shaft C when the feeders open to their full extent, the cross arms being set sufficiently one side of the ways to allow them thus to pass.

To aid the alternating motions of the feeders at their changes, when only two are used I attach a balance beam N to the back side of the governor stand M extending each way to a point directly below the middle of the feeders each end of which beam is connected with the bottom of the feeders by a steel wire flattened at or near its point of attachment, so as slightly to spring at each change of motion. The balance beam N may be omitted and the steel wires $e$, $e$, be connected at the stand M and attached where the beam is now attached, forming one continuous wire vibrating on its middle and flattened at proper points to produce the spring required.

To produce a current of inflammable gas for light and heat, for which this blower is particularly well adapted, I use in connection with it an iron or tin vessel of any convenient size and form and place in it a mixture of highly volatile carbonated chemicals, or the distilled product of such mixture and provide the interior of the vessel $g$, with numerous concentric partitions from two to two and a half inches apart all firmly attached to the top and extending down into the liquid chemicals to within half or quarter of an inch of the bottom. If my vessel be circular the partitions within are arranged in a coil, the parts being separated as above mentioned—the object being to retard the current of air so that it shall come in contact with the whole surface of the fluid and become fully charged with the inflammable gas evolved by the fluid, before it passes out into the pipes for use. The current of air is introduced into the vessel at the center and made to pass the entire circuit of apartments before being allowed to escape at the termination of the circuit at some convenient point in the top side or bottom of the vessel, where the distributing pipes are attached. The vessel must never be quite full.

The operation of my blower must be evident from the foregoing description, but to make it more clear if possible, I will state that the force of the springs $a$, $a$, is conducted by means of the driving wheel B and pinion D to the shaft C and thence to the arms E E, attached to and revolving with it. These arms operate through the rollers at the sides of their extremities on the elevating ways G, G, and alternately lift the feeders F F forcing the air produced into the reservoir or air-chamber H. From this it passes into the vessel $g$, containing the chemical mixture or volatile carbonated liquid, and combining with the inflammable gas evolved, passes out into the pipes and thence to the burners where it may be ignited. This is the operation when used for producing light or heat.

When used for forging, agitating milk for producing butter or for any other mechanical or chemical purpose the current need not of course be passed through the vessel $g$, but is taken directly from the reservoir or air-chamber H.

I make my blowers of various sizes—my drawings indicate the relative proportions of the different parts of the machine. The smaller sizes I propose to attach to the underside of center or other tables when one light may be desired on the top. The next size larger can be placed in a stand or other piece of furniture and one or more lights furnished in the room—the furniture being stationary if pipes are led from it.

For large machines where a strong blast or current is required I generally use weights instead of springs for the motive power. I contemplate making the vessel square and shallow, for the chemicals, and placing it beneath the whole machine, making its top the base of the machine. I also contemplate attaching a fuse to the main shaft, placing the springs on a third shaft and connecting the fuse and spring shaft by means of a chain or cord for the purpose of equalizing the force of the springs.

What I claim as my invention and desire to secure by Letters Patent of the United States is—

1. Operating the feeders F, F, alternately, by means of the cross arms E, E, with the rollers traversing the curvilinear elevating ways G, G, substantially as herein set forth.

2. Regulating the quantity of air admitted into the air-chamber H according to the quantity required by means of the check wire, $f$, and sliding arm or brake, $h$, operating on the balance wheel K arranged substantially as herein described.

3. Connecting the top and bottom of the air-chamber H by means of india rubber straps or other springs when used in combination with the mechanism for driving the feeders described to overcome and stop the operation of the motive power when the chamber is full, and thereby steady the current of air and prevent too great strain on the chamber.

JONATHAN GRIFFIN.

Witnesses:
ALEX S. ROWLEY,
ARTHUR PARTON.